United States Patent
Souma

(10) Patent No.: US 7,593,165 B2
(45) Date of Patent: Sep. 22, 2009

(54) ZOOM LENS AND IMAGE SENSING APPARATUS

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/133,698

(22) Filed: Jun. 5, 2008

(65) Prior Publication Data

US 2008/0304161 A1    Dec. 11, 2008

(30) Foreign Application Priority Data

Jun. 7, 2007   (JP) .............................. 2007-151810

(51) Int. Cl.
   *G02B 15/14* (2006.01)
(52) U.S. Cl. ..................... 359/680; 359/676; 359/683
(58) Field of Classification Search ......... 359/680–683, 359/676
   See application file for complete search history.

(56) References Cited

U.S. PATENT DOCUMENTS

| | | | |
|---|---|---|---|
| 3,192,829 A * | 7/1965 | Yamaji ....................... | 359/683 |
| 4,749,266 A * | 6/1988 | Takahashi et al. ........... | 359/683 |
| 5,847,882 A * | 12/1998 | Nakayama .................. | 359/684 |
| 7,139,131 B2 | 11/2006 | Nanba et al. ................ | 359/687 |
| 7,177,092 B2 | 2/2007 | Satori et al. ................. | 359/683 |
| 7,209,299 B2 | 4/2007 | Aoki .......................... | 359/683 |
| 2006/0056055 A1 | 3/2006 | Obama et al. ............... | 359/689 |

* cited by examiner

*Primary Examiner*—Scott J Sugarman
*Assistant Examiner*—James R Greece
(74) *Attorney, Agent, or Firm*—Sidley Austin LLP

(57) ABSTRACT

A zoom lens for forming an optical image of an object on a sensing surface of an image sensor at a variable magnification has first, second, third, fourth and fifth lens groups with positive-negative-positive-negative-positive zoom arrangement. Between the second lens group and the fourth lens group, an optical aperture stop is located. The fourth lens group is composed of one negative lens element having at least one aspherical surface and having a paraxial radius of curvature of an image side surface smaller than a paraxial radius of curvature of an object side surface, and satisfies conditional formula $-1.15 < f4/\sqrt{fw \cdot ft} < -0.5$ (where f4 represents a focal length of the fourth lens group, fw represents a focal length of an entire system at a wide-angle end, and ft represents a focal length of the entire system at a telephoto end).

11 Claims, 10 Drawing Sheets

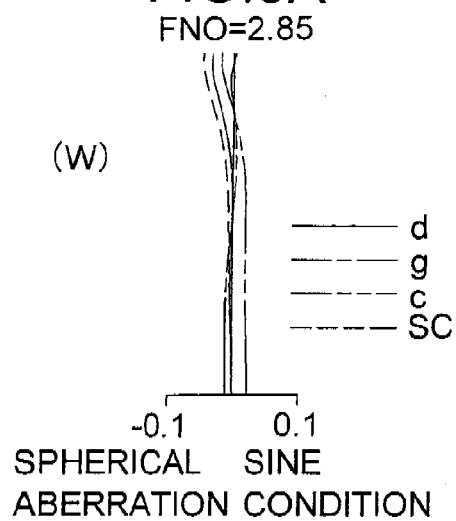
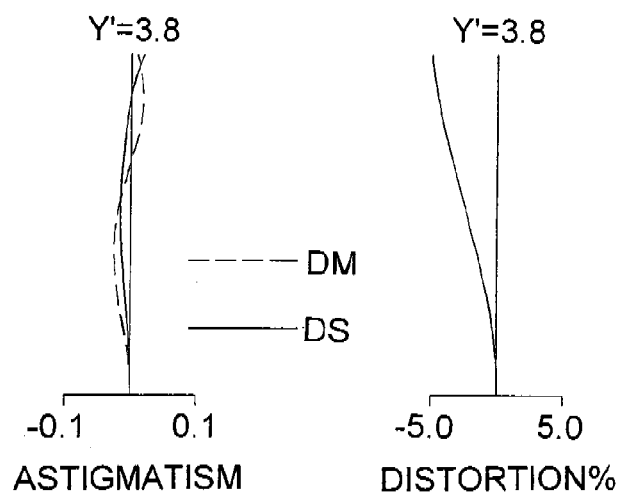
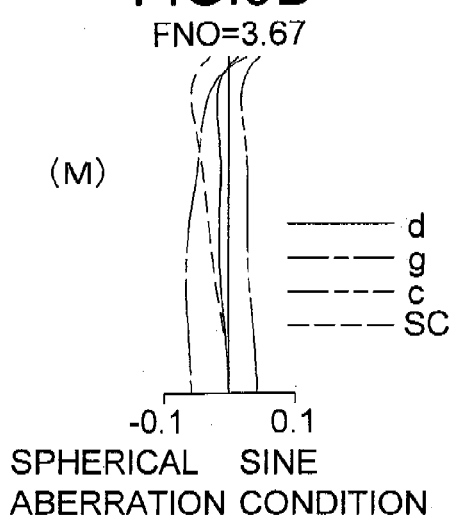
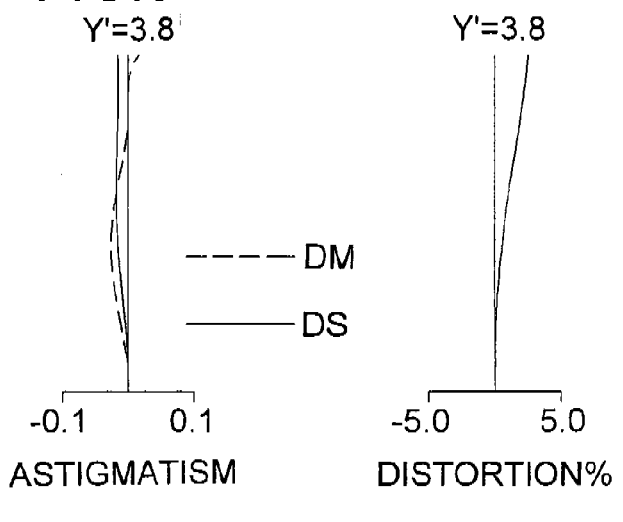
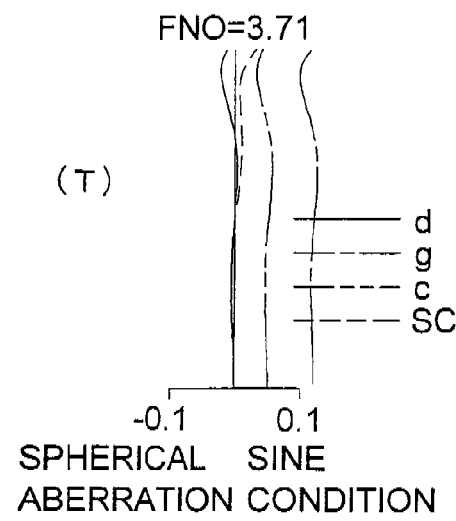
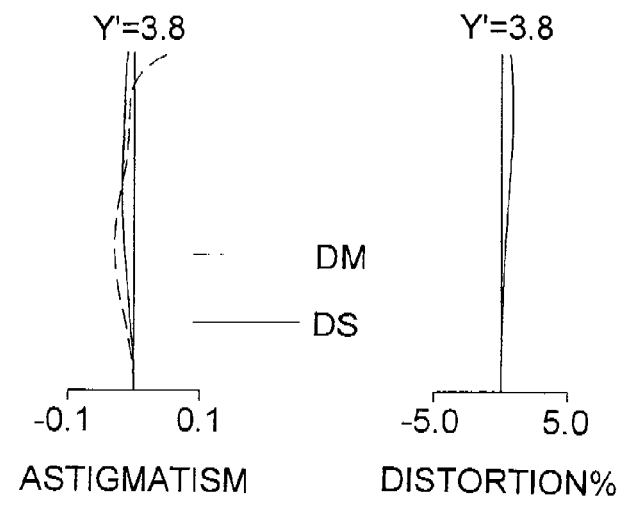

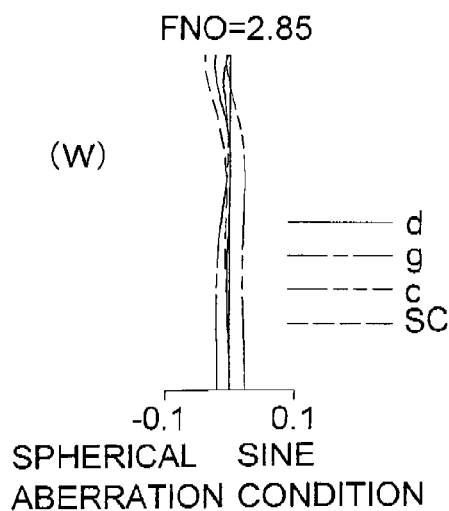
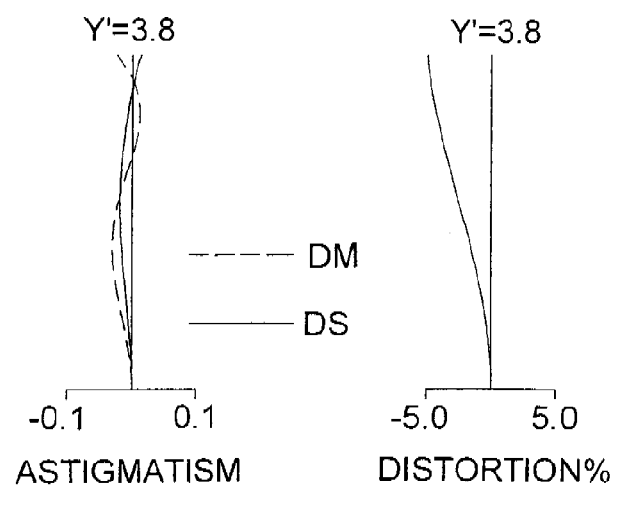
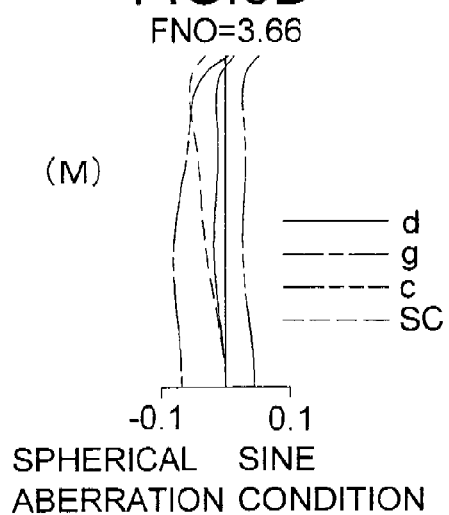
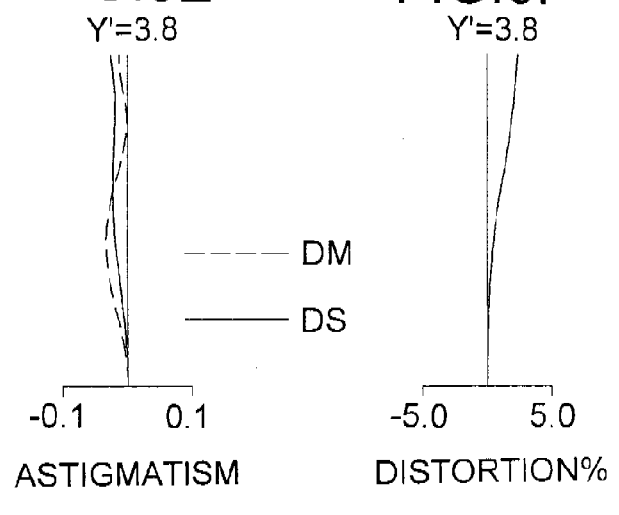
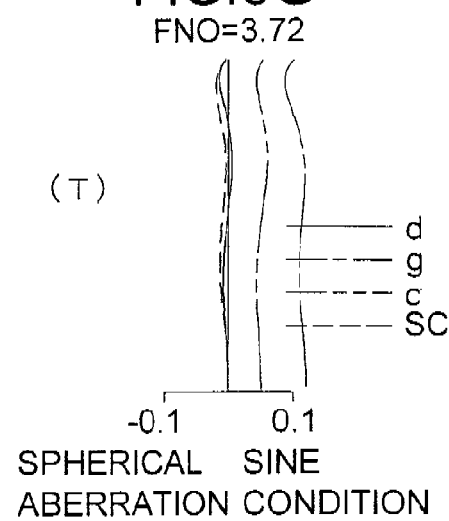
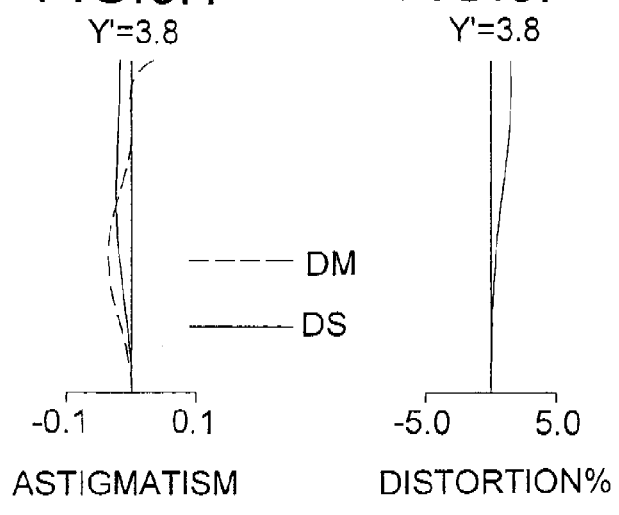

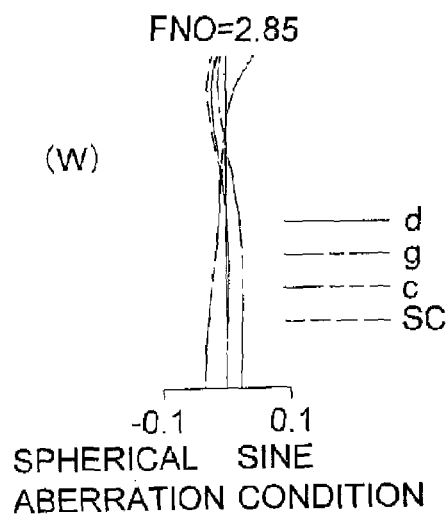
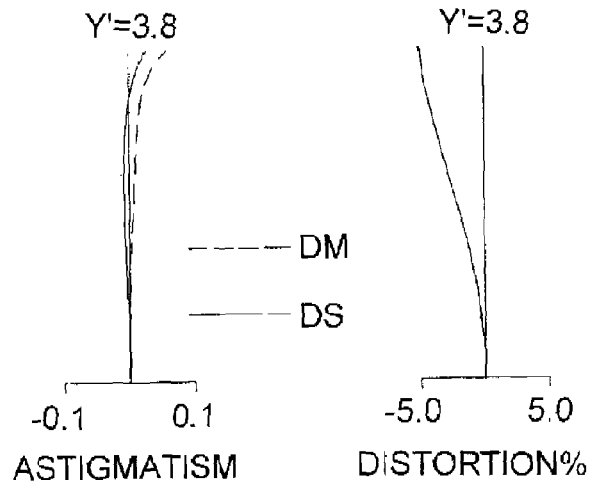
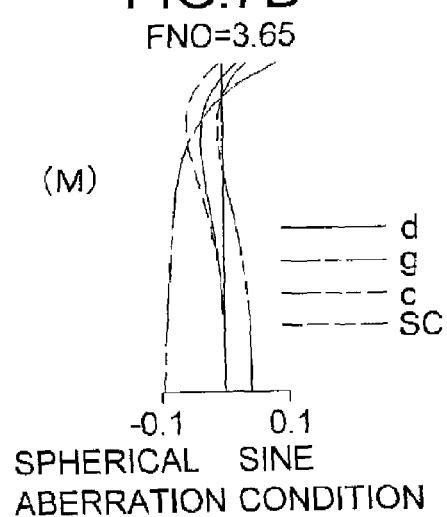
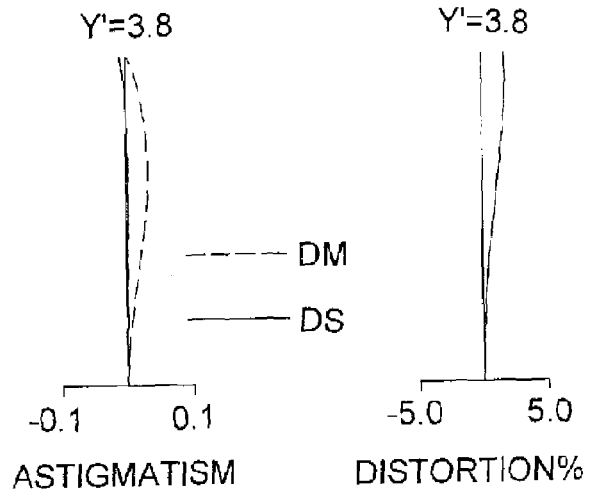
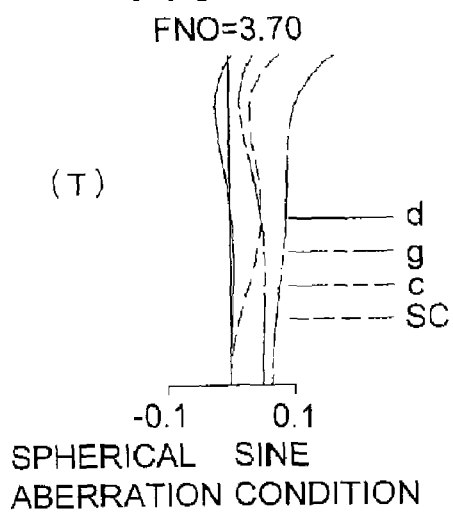
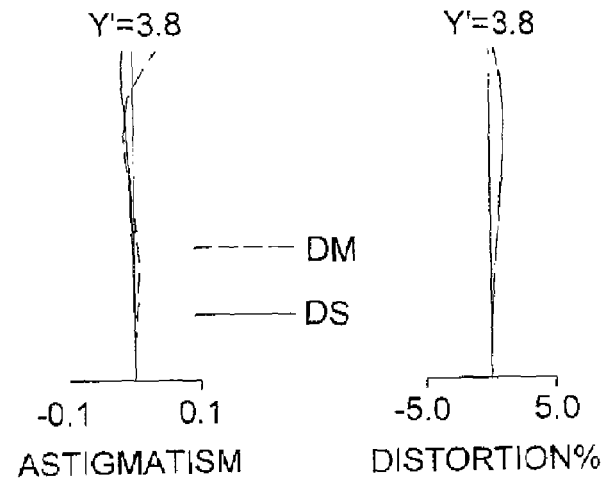

FNO=3.32

(W)

— d
--- g
--- c
--- SC

-0.1  0.1
SPHERICAL SINE
ABERRATION CONDITION

Y'=3.8

--- DM
— DS

-0.1  0.1
ASTIGMATISM

Y'=3.8

-5.0  5.0
DISTORTION%

FNO=4.42

(M)

— d
--- g
--- c
--- SC

-0.1  0.1
球面収差 正弦条件

Y'=3.8

--- DM
— DS

-0.1  0.1
ASTIGMATISM

Y'=3.8

-5.0  5.0
DISTORTION%

FNO=5.00

(T)

— d
--- g
--- c
--- SC

-0.1  0.1
SPHERICAL SINE
ABERRATION CONDITION

Y'=3.8

--- DM
— DS

-0.1  0.1
ASTIGMATISM

Y'=3.8

-5.0  5.0
DISTORTION%

ZOOM LENS AND IMAGE SENSING APPARATUS

This application is based on Japanese Patent Application No. 2007-151810 filed on Jun. 7, 2007, the contents of which are hereby incorporated by reference.

BACKGROUND OF THE INVENTION

1. Field of the Invention

The present invention relates to a zoom lens and an image sensing apparatus, and for example, to a zoom lens which is used in an optical unit or the like for taking a video of a subject with an image sensor and which includes a zoom area with a relatively wide angle at a magnification variation ratio of 7× or larger, and also to an image sensing apparatus provided therewith.

2. Description of Related Art

In recent years, digital cameras have been in rapid spread, and have been not only used as means for simply downloading an image to a computer but also widely used as a tool, like a conventional silver salt camera, for leaving a photo. Accordingly, there have arisen increasingly strong demands for capabilities useful for leaving a photo (for example, high magnification variation ratio, wider angle, etc.) and also for compactification. In addition, due to trends toward a yearly increase in the number of pixels of an image sensor, there have arisen demands for achieving even higher optical performance. Also in devices (for example, a camcoder) for mainly downloading moving images, due to support of a still image photographing capability and hi-vision, etc., there have arisen demands for higher optical performance than in a conventional one.

As one of ways to meet these demands, Patent documents 1 and 3 suggest a zoom lens which arranges, in order from an object side, a first lens group having a positive optical power, a second lens group having a negative optical power, a third lens group having a positive optical power, a fourth lens group having a positive optical power, and a fifth lens group having a positive optical power, and which achieves a high magnification variation ratio. Moreover, Patents Documents 2 and 3 suggest a zoom lens which arranges, in order from an object side, a first lens group having a positive optical power, a second lens group having a negative optical power, a third lens group having a positive optical power, a fourth lens group having a negative optical power, and a fifth lens group having a positive optical power, and which achieves a high magnification variation ratio.

Patent Document 1: US2006/0056055A1
Patent Document 2: U.S. Pat. No. 7,177,092B2
Patent Document 3: U.S. Pat. No. 7,139,131B2

The zoom lenses disclosed in Patent Documents 1 and 2 include in a zoom area a wide angle of view with a whole angle of view of 77 degrees and achieve a high magnification variation ratio of approximately 10×, but face a problem of a relatively large optical system size. In addition, in order to correct off-axis aberration associated with a wide angle of view, an aspherical surface molded with glass is used in a plurality of lens groups including the second lens group having a relatively large aperture, which brings about concerns about resulting cost increase. The zoom lens disclosed in Patent Document 3 has a relatively small optical system size but fails to simultaneously achieve a wide angle of view with a whole angle of view of over 70 degrees and a high magnification variation ratio of over 10×.

SUMMARY OF THE INVENTION

In view of the circumstances described above, the present invention has been made, and it is an object of the invention to provide a zoom lens including in a zoom area a wide angle of view with a whole angle of view of over 70 degrees and having a high magnification variation ratio of approximately 12×, and also to provide an image sensing apparatus provided with such a zoom lens.

To achieve the object described above, according to one aspect of the invention, a zoom lens for forming an optical image of an object on a sensing surface of an image sensor at a variable magnification includes, in order from an object side to an image side: a first lens group having a positive optical power; a second lens group having a negative optical power; a third lens group having a positive optical power; a fourth lens group having a negative optical power; and a fifth lens group having a positive optical power. Between the second lens group and the fourth lens group, an optical aperture stop is located. The fourth lens group is composed of one negative lens element having at least one aspherical surface and having a paraxial radius of curvature of an image side surface smaller than a paraxial radius of curvature of an object side surface, and satisfies conditional formula (1) below:

$$-1.15 < f4/\sqrt{fw \cdot ft} < -0.5 \qquad (1),$$

where
 f4 represents a focal length of the fourth lens group;
 fw represents a focal length of an entire system at a wide-angle end; and
 ft represents a focal length of the entire system at a telephoto end.

According to another aspect of the invention, an image sensing apparatus includes: a zoom lens for forming an optical image of an object at a variable magnification; and an image sensor converting an optical image formed on a sensing surface into an electrical signal. The zoom lens is so arranged that an optical image of a subject is formed on the sensing surface of the image sensor. The zoom lens includes, in order from an object side to an image side: a first lens group having a positive optical power; a second lens group having a negative optical power; a third lens group having a positive optical power; a fourth lens group having a negative optical power; and a fifth lens group having a positive optical power. Between the second lens group and the fourth lens group, an optical aperture stop is located. The fourth lens group is composed of one negative lens element having at least one aspherical surface and having a paraxial radius of curvature of an image side surface smaller than a paraxial radius of curvature of an object side surface, and satisfies conditional formula (1) below:

$$-1.15 < f4/\sqrt{fw \cdot ft} < -0.5 \qquad (1),$$

where
 f4 represents a focal length of the fourth lens group;
 fw represents a focal length of an entire system at a wide-angle end; and
 ft represents a focal length of the entire system at a telephoto end.

BRIEF DESCRIPTION OF THE DRAWINGS

FIGS. 5A to 5I are aberration diagrams of Example 1;

FIGS. 6A to 6I are aberration diagrams of Example 2;

FIGS. 7A to 7I are aberration diagrams of Example 3;

DETAILED DESCRIPTION OF THE PREFERRED EMBODIMENTS

Figure 1:
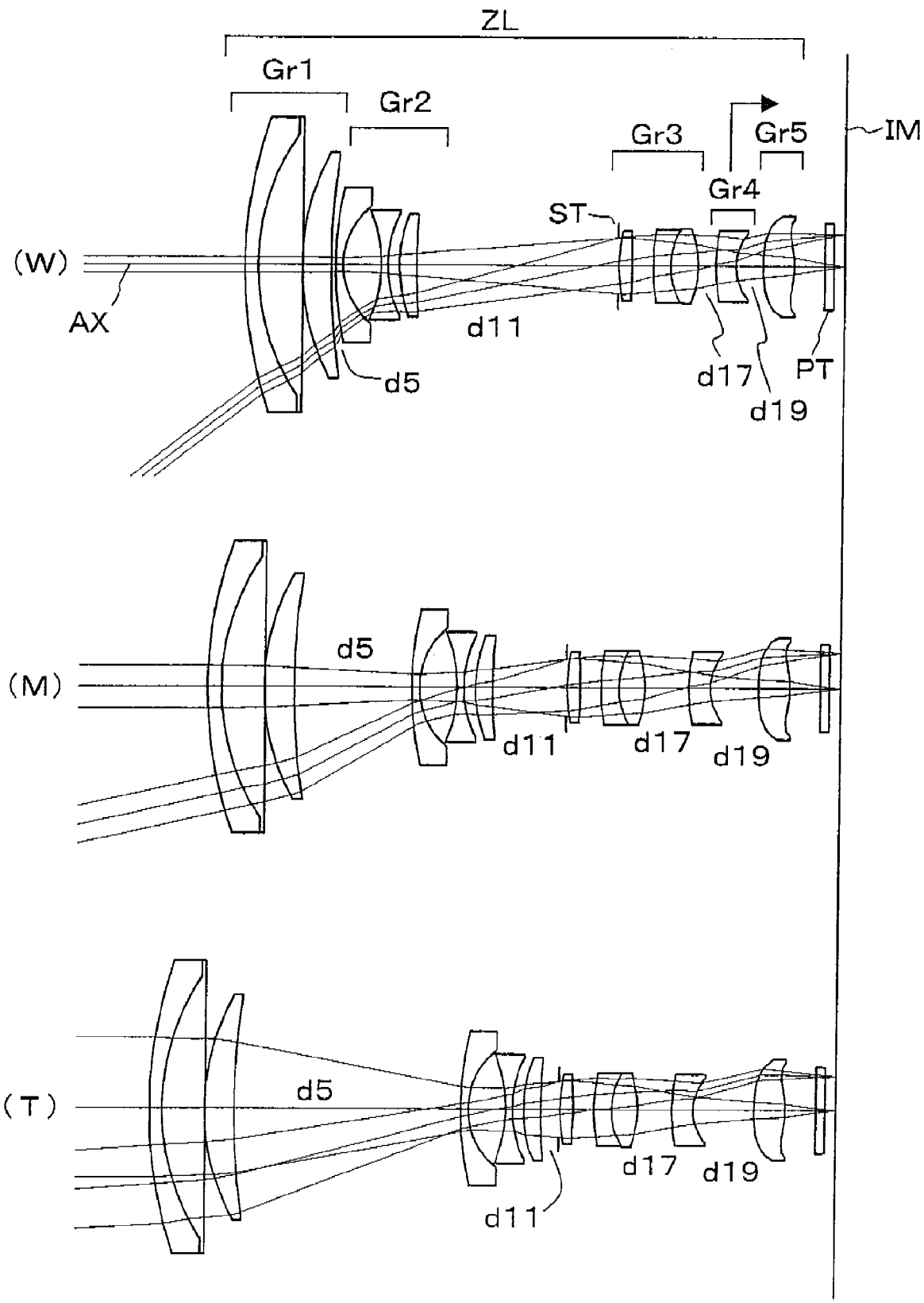
FIG. 1 is an optical construction diagram of a first embodiment (Example 1)
Figure 2:
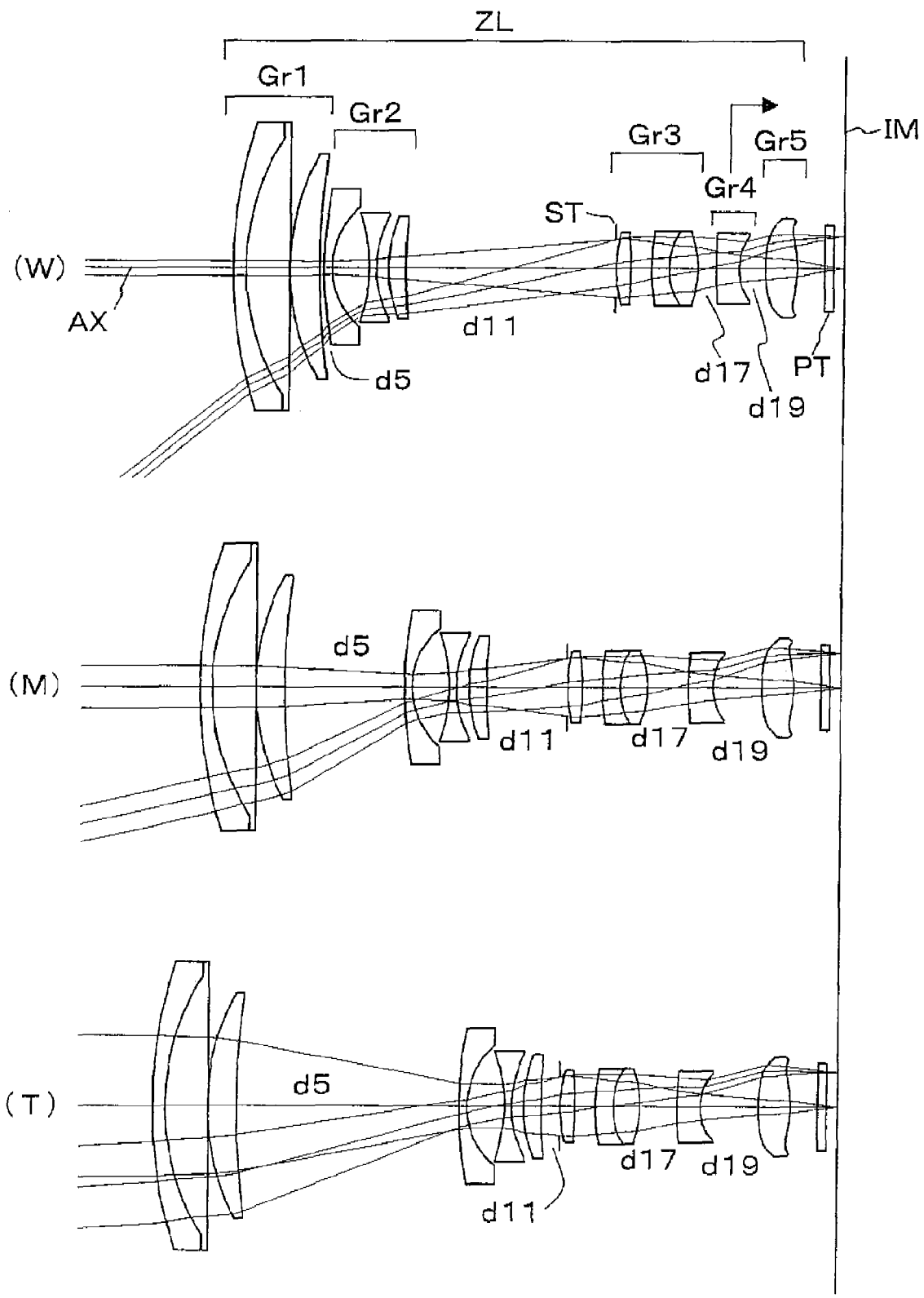
FIG. 2 is an optical construction diagram of a second embodiment (Example 2)
Figure 3:
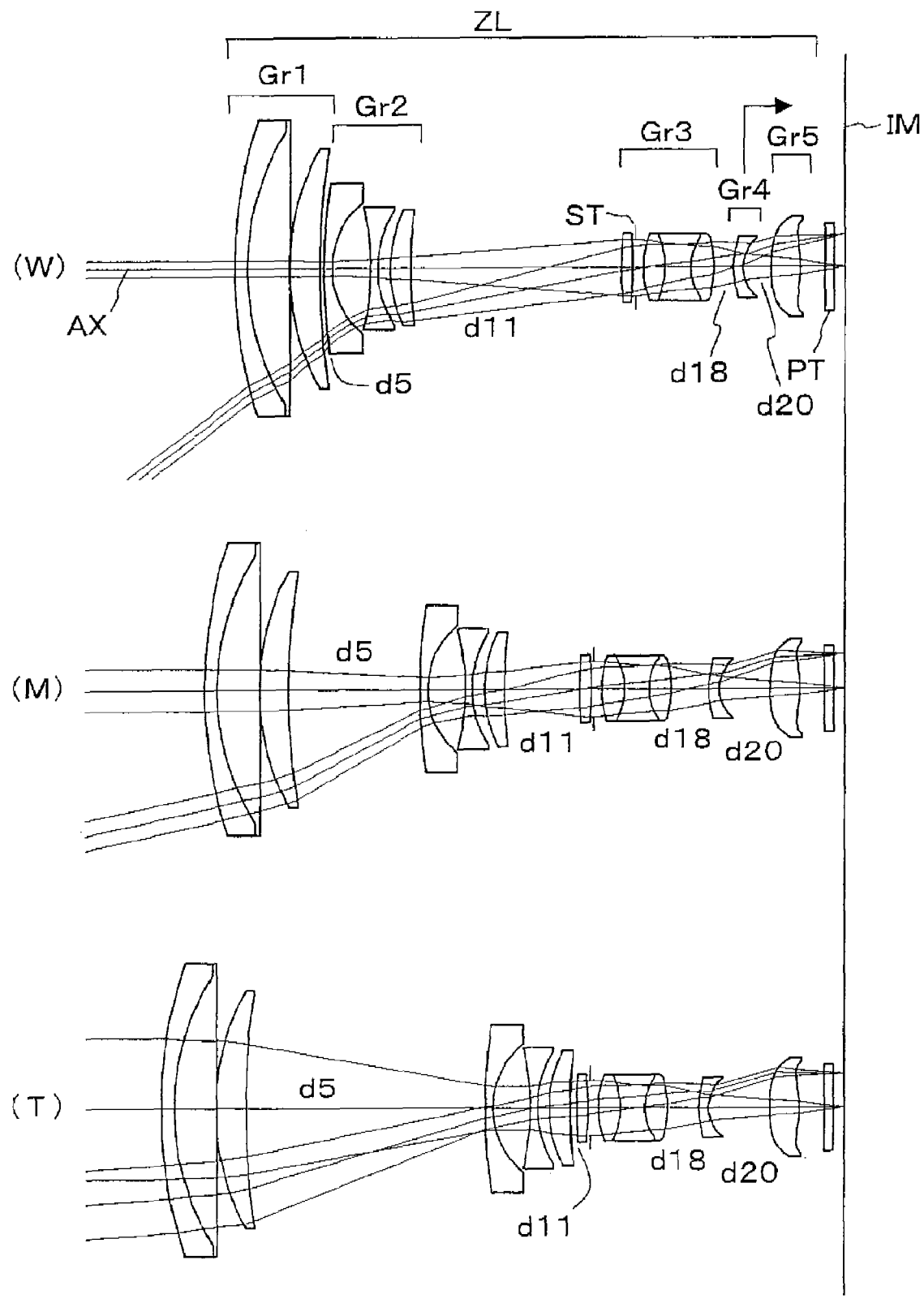
FIG. 3 is an optical construction diagram of a third embodiment (Example 3)
Figure 4:
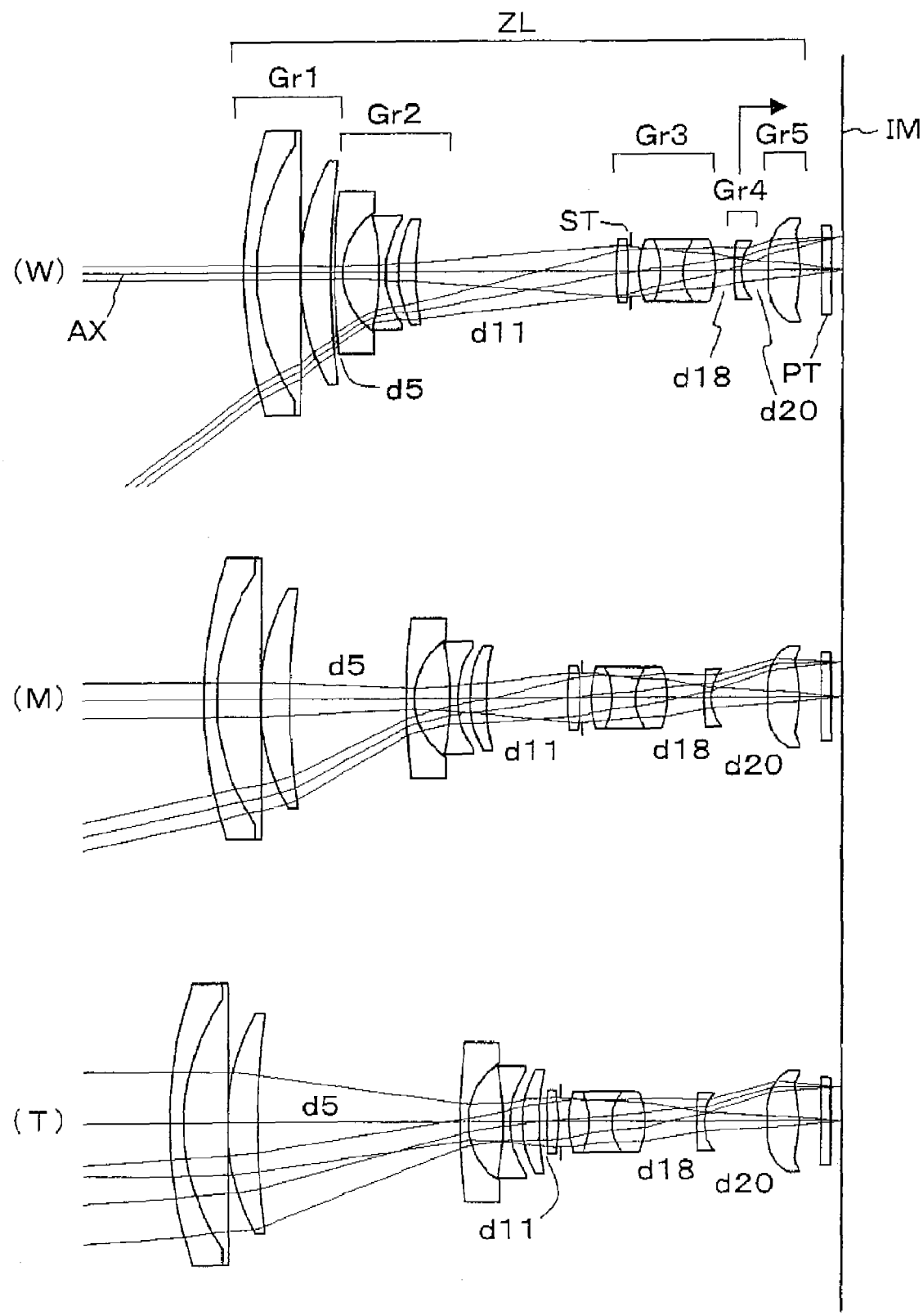
FIG. 4 is an optical construction diagram of a fourth embodiment (Example 4)
Figure 8A:
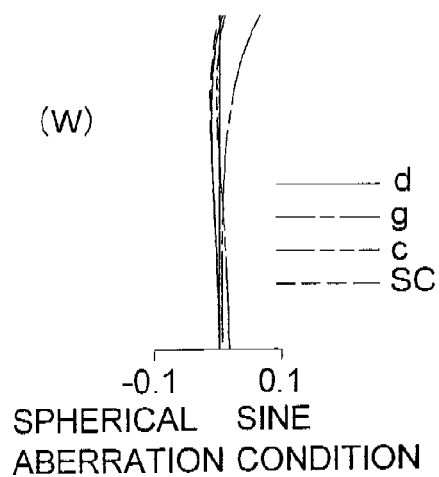
FIGS. 8A to 8I are aberration diagrams of Example 4.
Figure 8B:
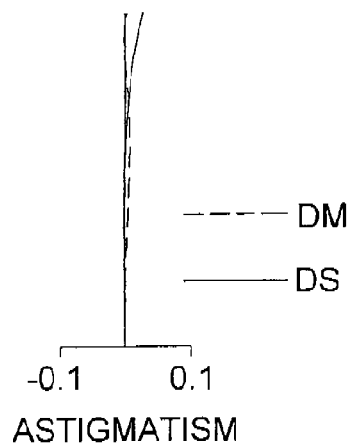
Figure 8C:
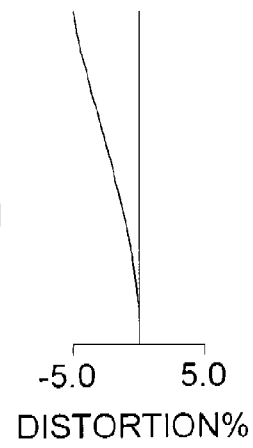
Figure 8D:
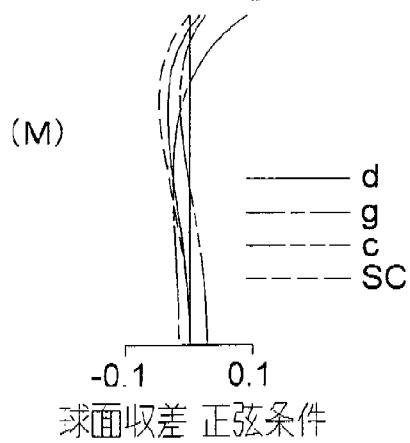
Figure 8E:
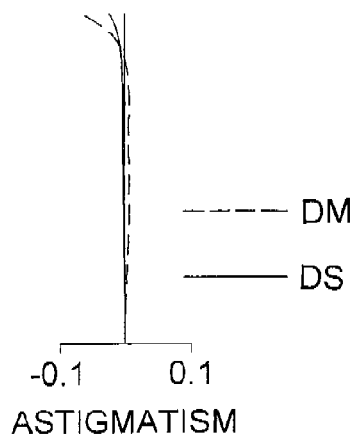
Figure 8F:
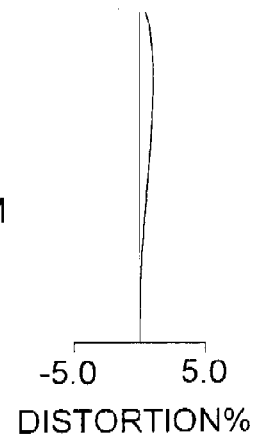
Figure 8G:
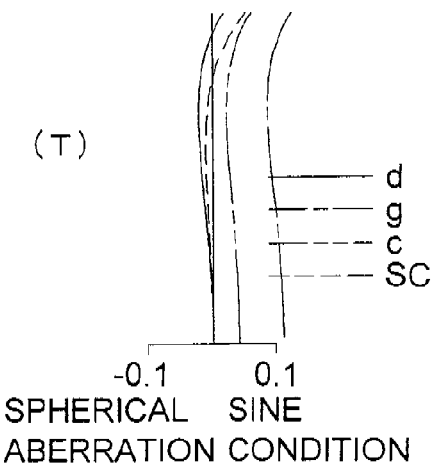
Figure 8H:
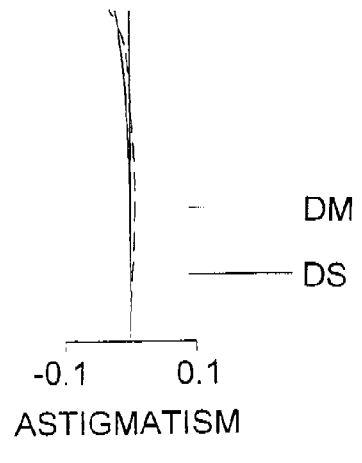
Figure 8I:
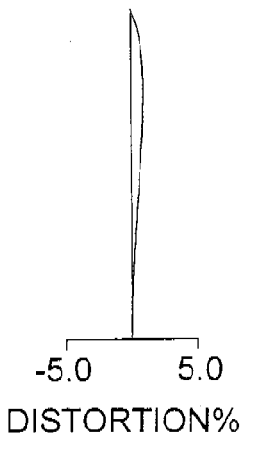

Hereinafter, a zoom lens, an image sensing apparatus according to the present invention, etc. will be described with reference to the accompanying drawings. The zoom lens according to the invention is a zoom lens for forming an optical image of an object on a sensing surface of an image sensor at a variable magnification. The zoom lens is composed of, in order from an object side to an image side: a first lens group having a positive optical power; a second lens group having a negative optical power; a third lens group having a positive optical power; a fourth lens group having a negative optical power, and a fifth lens group having a positive optical power. Between the second and fourth lens groups, an optical aperture stop is located. The fourth lens group is composed of one negative lens element having at least one aspherical surface, and satisfies conditional formula (1) below:

$$-1.15 < f4/\sqrt{fw \cdot ft} < -0.5 \qquad (1),$$

where f4 represents a focal length of the fourth lens group;

fw represents a focal length of an entire system at a wide-angle end; and ft represents a focal length of the entire system at a telephoto end.

In a typical positive-led optical system, the second lens having a negative optical power serves as a portion mainly in charge of magnification variation, and has a relatively strong optical power. Moreover, the height of an off-axis ray is highest at the wide-angle end in the second lens group. Therefore, achieving a wider angle of view results in a problem with off-axis aberration occurring in the second lens group. With the zoom lens embodying the invention, providing the fourth lens group, which is so arranged as to be located after the second lens group and the optical aperture stop, with a relatively strong negative optical power permits canceling the off-axis aberration, such as astigmatism and distortion, occurring in the second lens group by the fourth lens group. Moreover, arranging at least one aspherical surface in the fourth lens group permits composing the fourth lens group with one lens element while keeping a desired optical power of the fourth lens group.

It is preferable that one negative lens element composing the fourth lens group have a smaller paraxial radius of curvature of an image side surface thereof than that of an object side surface thereof, that is, one negative lens element be shaped such that an optical power of the image side surface is stronger than an optical power of the object side surface. The action of canceling the aforementioned off-axis aberration occurring in the second lens group by the fourth lens group specifically means that positive distortion and positive astigmatism are caused by the fourth lens group (where the sign of astigmatism in a direction from the object side to the image side is positive). Therefore, a shape such that the optical power of the object side surface is stronger than the optical power of the image side surface, unlike the preferable shape described above, is a shape with its concave surface facing the optical aperture stop. Thus, the amounts of distortion and astigmatism occurring on this surface decrease, resulting in insufficient action of canceling the off-axis aberration occurring in the second lens group.

The conditional formula (1) defines a preferable conditional range related to the optical power of the fourth lens group. If a lower limit of the conditional formula (1) is disregarded, the optical power of the fourth lens group becomes too weak, which leads to upsizing of the optical system and also to insufficient action of canceling the off-axis aberration occurring in the second lens group. On the other hand, if an upper limit of the conditional formula (1) is disregarded, it is preferable in terms of downsizing of the optical system but the optical power of the fourth lens group becomes too strong, which makes it difficult to maintain favorable balance of aberration occurring in the second lens group and the other lens groups.

It is further preferable that conditional formula (1a) below be satisfied:

$$-0.9 < f4/\sqrt{fw \cdot ft} < -0.6 \qquad (1a).$$

This conditional formula (1a) defines, within the conditional range defined by the conditional formula (1), a conditional range further preferable out of the above-stated points and other considerations.

For the shape of the negative lens element composing the fourth lens group, it is preferable that conditional formula (4) below be satisfied:

$$0.2 < (R1+R2)/(R1-R2) < 6.0 \qquad (4),$$

where

R1 represents a radius of curvature of the object side surface of the negative lens element composing the fourth lens group; and R2 represents a radius of curvature of the image side surface of the negative lens element composing the fourth lens group.

The conditional formula (4) defines a preferable conditional range related to the shape of the negative lens element composing the fourth lens group. If a lower limit of the conditional formula (4) is disregarded, a difference in the negative optical power between the object side surface and the image side surface becomes small, thus resulting in weakened action of canceling the off-axis aberration such as astigmatism and distortion occurring in the second lens group by the fourth lens group, which is not preferable. On the other than, if an upper limit of the conditional formula (4) is disregarded, it becomes difficult to obtain a negative optical power required for the fourth lens group, which is not preferable.

It is preferable that the fifth lens group be composed of one positive lens element. Due to its proximity to the image surface, the fifth lens group has a low axial ray height and has relatively small amounts of spherical aberration and coma aberration occurring therein. Therefore, composing the fifth lens group with one positive lens element is preferable in terms of achieving cost reduction and downsizing of the optical system.

It is preferable that the positive lens element in the fifth lens group have at least one aspherical surface. Arranging at least one aspherical surface in the fifth lens group permits efficiently correcting distortion and astigmatism.

It is preferable that a material of the positive lens element in the fifth lens group be resin. Due to its proximity to the image surface, the fifth lens group has a low axial ray height; thus, even when one positive lens element of the fifth lens group is formed of a resin material, a variation in focusing position caused by temperature change and performance deterioration caused by surface accuracy error, which become problematic when the resin material is used, are less likely to occur. Therefore, it is preferable in terms of costs and weight that one positive lens element of the fifth lens group be formed of a resin material.

It is preferable that the fifth lens group be fixed during zooming. Fixing the fifth lens group during zooming permits achieving effective mechanism simplification.

It is preferable that a material of the negative lens element in the fourth lens group be resin. Forming the negative lens element having an aspherical surface with a glass material is technically more difficult than forming it with a resin material. Therefore, it is preferable in terms of costs that the fourth lens group be formed of a resin material. Moreover, since the fourth lens group is located near a midpoint between the optical aperture stop and the image surface and has a relatively low ray height, the variation in focusing position caused by temperature change and the performance deterioration caused by surface accuracy error, which becomes problematic when the resin material is used, are relatively easily allowed.

Since the fourth lens group has a relatively low ray height as described above, amounts of spherical aberration and coma aberration occurring therein are relatively small. Therefore, composing the fourth lens group with one negative lens element is preferable in terms of achieving cost reduction and downsizing of the optical system. It is further preferable that the fourth lens group be composed of one negative meniscus lens element convex to the object side. Using resin as the material of the negative lens element composing the fourth lens group as described above further improves effect of weight reduction and downsizing and also cost reduction.

For the optical powers of the first lens group, the fourth lens group, and the fifth lens group, it is preferable that conditional formulae (2) and (3) below be satisfied:

$$1.6 < f1/\sqrt{fw \cdot ft} < 5.0 \qquad (2),$$

$$-2.0 < f4/f5 < -0.5 \qquad (3),$$

where
- f1 represents a focal length of the first lens group;
- f4 represents a focal length of the fourth lens group;
- f5 represents a focal length of the fifth lens group;
- fw represents a focal length of the entire system at the wide-angle end; and
- ft represents a focal length of the entire system at the telephoto end.

The conditional formula (2) defines a preferable conditional range related to the optical power of the first lens group. If a lower limit of the conditional formula (2) is disregarded, the optical power of the first lens group becomes too strong, which is preferable in terms of downsizing the optical system but makes it difficult to correct spherical aberration and astigmatism at the telephoto end occurring in the first lens group. On the other hand, if an upper limit of the conditional formula (2) is disregarded, the optical system is upsized too much, which is not preferable.

It is further preferable that conditional formula (2a) below be satisfied:

$$2.1 < f1/\sqrt{fw \cdot ft} < 3.0 \qquad (2a).$$

This conditional formula (2a) defines, within the conditional range defined by the conditional formula (2), a conditional range further preferable out of the above-stated points and other considerations.

The conditional formula (3) defines a preferable conditional range related to an optical power ratio between the fourth lens group and the fifth lens group. Deviation from the range defined by the conditional formula (3) increases an angle variation following zooming in an off-axis ray incident on the image sensor. On a typical solid-state image sensor, image quality deterioration such as color unevenness occurs as a result of deviation from a predetermined range of angles of incidence.

It is further preferable that conditional formula (3a) below be satisfied:

$$-1.0 < f4/f5 < -0.7 \qquad (3a).$$

This conditional formula (3a) defines, within the conditional range defined by the conditional formula (3), a conditional range further preferable out of the above-stated points and other considerations.

It is preferable that focusing on an object at a short distance be performed by moving the fourth lens group along the optical axis. Since the fourth lens group is composed of one negative lens element, it is light in weight, and thus is advantageous in downsizing a driving actuator and power consumption when used as a focus group.

It is preferable that the third lens group include a triplet-cemented lens element composed of three lens elements. The third lens group is a group in charge of a main portion serving for converging the entire system, and is required to have some optical power in order to avoid upsizing of the optical system. Moreover, due to its proximity to the optical aperture stop, the third lens group has a high axial ray height. Therefore, the third lens group faces great challenges of correcting spherical aberration and coma aberration. Typically, the spherical aberration and coma aberration are efficiently corrected by using an aspherical surface. The same effect of correcting aberration as is provided by the aspherical surface can be achieved by arranging two cemented surfaces having relatively strong curvature by use of a triplet-cemented lens element and generating aberration that cancels the spherical aberration and coma aberration described above. Considering the market trend of components, etc. at product designing, whether or not to use an aspherical surface can be selected.

It is preferable that the triplet-cemented lens element described above include, from the object side to the image side, a positive lens element whose convex surface faces the object side, a negative lens element, and a positive lens element whose convex surface faces the image side, and it is also preferable that the triplet-cemented lens element described above satisfy conditional formula (5) below:

$$ndn - ndp > 0.15 \qquad (5),$$

where
- ndn represents a refractive index of the negative lens element composing the triplet-cemented lens element; and
- ndp represents an average refractive index of the two positive lens elements composing the triplet-cemented lens element.

Composing the triplet-cemented lens element as described above can contribute to the positive optical power of the third lens group since two surfaces forming a boundary with air have a positive optical power. Failure to ensure a sufficient positive optical power of the third lens group results in upsizing of the optical system, which is not preferable. If a lower limit of the conditional formula (5) is disregarded, the amount of aberration occurring on the cemented surfaces becomes insufficient, resulting in difficulty in providing effect of correcting an expected amount of aberration.

It is preferable that the aforementioned lens element whose material is resin be a lens shaped by using a raw material having particles of a maximum length of 30 nanometers or less dispersed in a resin material. Mixing fine particles with a transparent resin material typically causes light scattering and reduces transmittance, which makes it difficult to use it as an optical material. However, it is possible to practically avoid occurrence of light scattering by making the size of fine particles smaller than the wavelength of a transmitted beam. The refractive index decreases with an increase in the temperature of the resin material, while the refractive index increases with an increase in the temperature of inorganic particles. Thus, through an action such that the both cancel out each other by utilizing their temperature dependence, it is possible to almost completely prevent a change in the refractive index. More specifically, dispersing inorganic particles of a maximum length of 30 nanometers or less in a resin material serving as a base material permits providing a resin material whose refractive index has extremely low temperature dependence. For example, dispersing fine particles of niobium oxide ($Nb_2O_5$) in acrylic resin can reduce a change in the refractive index caused by a temperature change. In the zoom lens embodying the invention, using such a resin material with inorganic particles dispersed therein for at least one lens element (for example, the positive lens element in the fifth lens group or the negative lens element in the fourth lens group is preferable) can keep small back-focus shift accompanying an environmental temperature change of an entire image sensing lens system.

The zoom lens embodying the invention is suitable for use as an image sensing optical system for a digital device (for example, digital camera, video camera, or the like) provided with an image input capability. Combining this with an image sensor or the like permits forming an image sensing apparatus that optically captures a video of a subject and outputs it as an electrical signal. The image sensing apparatus is an optical apparatus forming a main component of a camera used for photographing a still image and a moving image of a subject. The image sensing apparatus is composed of, in order from the object (that is, subject) side: for example, an image sensing optical system forming an optical image of an object; and an image sensor converting the optical image formed by the image sensing optical system into an electrical signal.

Examples of such cameras include: digital cameras, video cameras, surveillance cameras, car-mounted cameras, and cameras for videophones; and cameras incorporated in, or externally fitted to, personal computers, portable information devices (information device terminals that are compact and portable, such as mobile computers, cellular phones, and portable information terminals), peripheral devices for those (such as scanners and printers), and other digital devices. As these examples tell, it is possible not only to build cameras by the use of image sensing apparatuses, but also to add camera capabilities to various appliances by incorporating image sensing apparatuses in them. For example, it is possible to build a digital appliance equipped with an image input capability, such as a cellular phone equipped with a camera.

Figure 9:
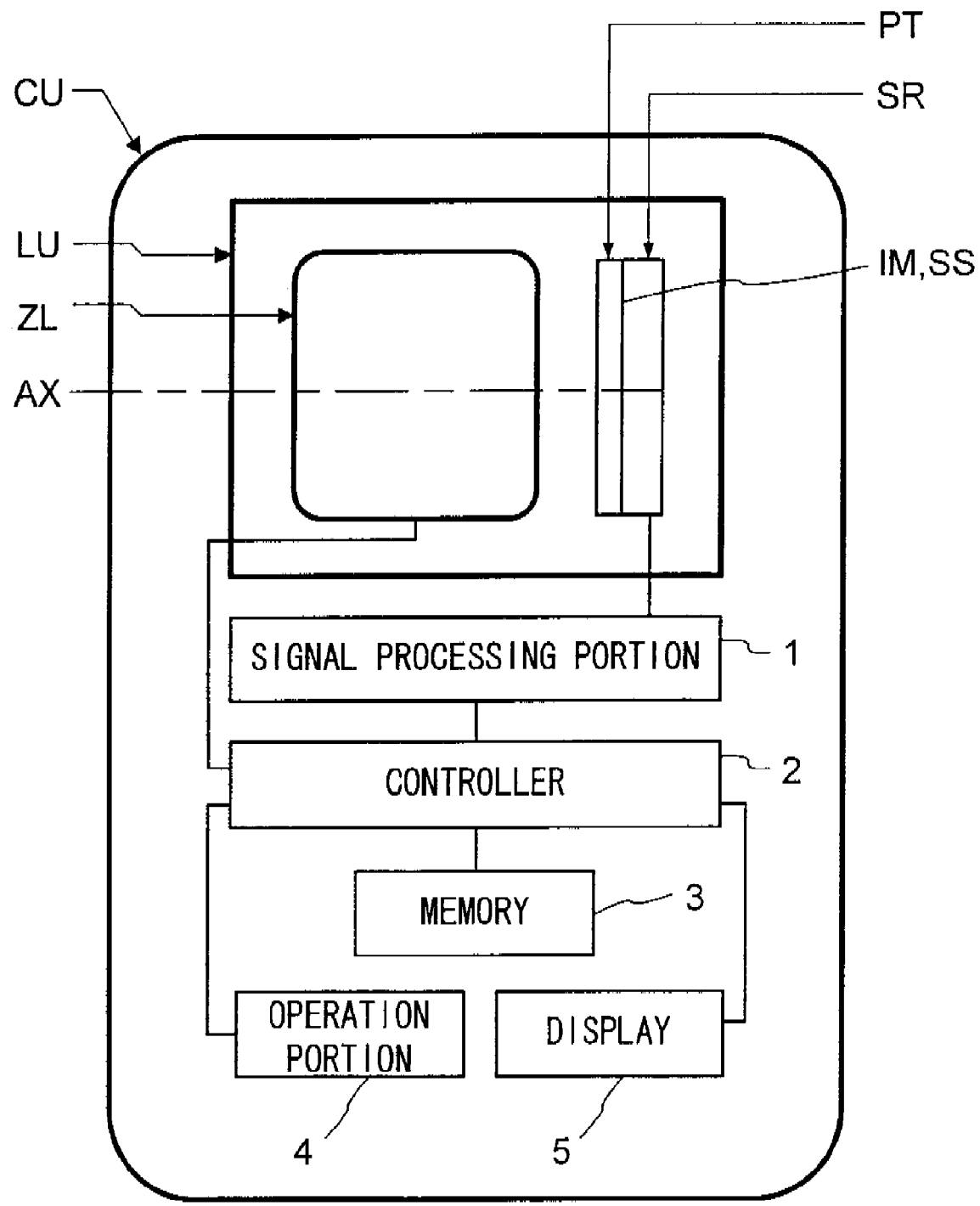
FIG. 9 is a schematic sectional view showing an outline of an example of the configuration of a digital device incorporating an image sensing apparatus.
Figure 10A:
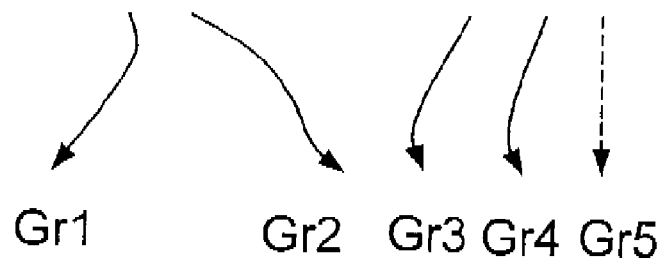
FIGS. 10A to 10D are diagrams schematically showing the zooming movement loci of the individual lens groups in the first to fourth embodiments (Examples 1 to 4), respectively.
Figure 10B:
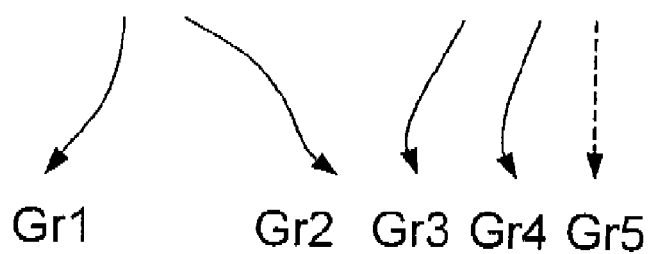
Figure 10C:
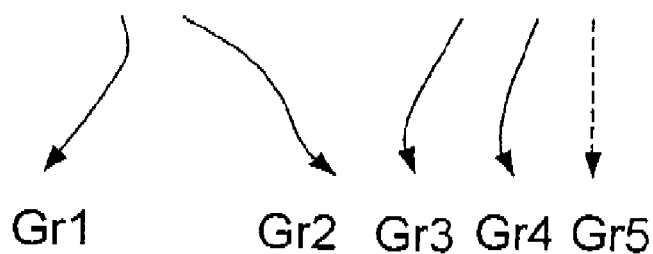
Figure 10D:
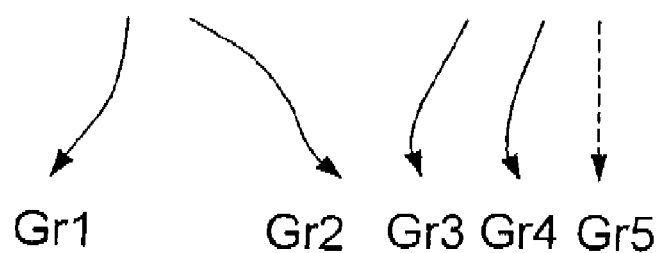

FIG. 9 schematically shows in cross section a general optical construction example of a digital device CU (corresponding to a digital device equipped with an image input capability, such as a digital camera or the like). An image sensing apparatus LU loaded in the digital device CU shown in FIG. 9 includes: in order from the object (that is, subject) side, a zoom lens ZL that forms an optical image (image surface) IM of an object at a variable magnification; a plane-parallel plate PT (corresponding to an optical filter such as an optical low-pass filter, an infrared cut filter, or the like arranged as necessary, and also to the cover glass of an image sensor SR or the like); and the image sensor SR that converts the optical image IM formed on a sensing surface SS thereof by the zoom lens ZL into an electrical signal. When this image sensing apparatus LU is used to build the digital device CU equipped with an image input capability, it is usually arranged inside the body thereof When realizing a camera capability, it is possible to adopt a construction that suits particular needs. For example, the image sensing apparatus LU may be built as a unit that is freely attachable to and detachable from, or rotatable relative to, the main unit of the digital device CU.

Used as the image sensor SR is, for example, a solid-state image sensor such as a CCD (charge-coupled device) or CMOS (complementary metal-oxide-semiconductor) sensor having a plurality of pixels. The zoom lens ZL is provided so that the optical image IM of the subject is formed on the sensing surface SS of the image sensor SR; therefore, the optical image IM formed by the zoom lens ZL is converted into an electrical signal by the image sensor SR.

The digital device CU includes, in addition to the image sensing apparatus LU, a signal processing portion 1, a controller 2, a memory 3, an operation portion 4, a display 5, etc. The signal produced by the image sensor SR is, after being subjected to predetermined digital image processing, image compassion processing, or other processing at the signal processing portion 1 as necessary, recorded as a digital video signal in the memory 3 (such as a semiconductor memory or an optical disk), and is then, as the case may be, transmitted to another appliance via a cable or after being converted into an infrared signal. The controller 2 is formed of a microcomputer and intensively controls a photographing capability, an image reproduction capability, a lens moving mechanism for zooming and focusing, etc. For example, the controller 2 performs control on the image sensing apparatus LU so that photographing at least one of a still image and a moving image of a subject is performed. The display 5 is a portion including a display such as a liquid crystal monitor, and performs image display by using the image signal converted by the image sensor SR or the image information recorded in the memory 3. The operation portion 4 is a portion including operation members such as operation buttons (for example, release button), operation dials (for example, photograph mode dial), etc., and transmits information inputted through operation by the operator to the controller 2.

The zoom lens ZL employs zoom structure with five groups having positive, negative, positive, negative, and positive optical powers as described above, and is so constructed as to achieve magnification variation (that is, zooming) by moving the plurality of lens groups along the optical axis AX to change lens intervals. When the optical image to be formed by the zoom lens ZL passes through the optical low-pass filter (corresponding to the plane-parallel plate PT shown in FIG. 9), which has a predetermined cut-off frequency characteristic determined by the pixel pitch of the image sensor SR, the spatial frequency characteristic is so adjusted as to minimize so-called aliasing noise that is produced when the optical image is converted into an electrical signal. This helps suppress color moire. By suppressing the performance around the resolution limit frequency, however, there is no need to concern about noise generation even without the use of the optical low-pass filter. Also in a case where a user performs photographing or viewing by the use of a display system on which noise is not clearly recognizable (for example, the liquid crystal screen of a cellular phone), there is no need to use the optical low-pass filter.

Next, referring to first to fourth embodiments, detailed optical construction of the zoom lens ZL will be described in more detail. FIGS. 1 to 4 respectively show the first to fourth embodiments of the zoom lens ZL in lens arrangement as observed at the wide-angle end (W), at the middle focal length (M), and at the telephoto end (T). The zoom lenses ZL according to the first to fourth embodiments are each a zoom lens, with five groups having positive, negative, positive, negative, and positive optical powers, that forms the optical image IM of an object on the image sensor SR at a variable magnification. Its zooming is performed by changing each lens interval (for example, surface intervals d5, d11, d17, and d19 in the first and second embodiments, and surface intervals d5, d11, d18, and d20 in the third and fourth embodiments). FIGS. 10A to 10D schematically show by arrows zoom movement loci corresponding to the first to fourth embodiments. The zoom movement loci respectively show movements of a first lens group Gr1 to a fifth lens group Gr5 during zooming from the wide-angle end (W) to the telephoto end (T) (that is, a relative positional change with respect to the image surface IM). A movement locus shown by an arrow of a broken line indicates that the fifth lens group Gr5 is fixed in position during zooming (that is, is a fixed group).

In any of the embodiments, as shown in FIGS. 1 to 4, upon focusing on an object at a short distance, the fourth lens group Gr4 is so constructed to move to the image side. That is, the fourth lens group Gr4 is a focus component. Moreover, in the third lens group Gr3, a stop (optical aperture stop) ST is arranged on the side closest to the object or between a positive lens element and a cemented lens element. This stop ST moves integrally with the third lens group Gr3 during zooming (FIGS. 1 to 4). Lens construction of each of the embodiments will be described below in detail.

In the first embodiment (FIG. 1), the lens groups are constructed as described below. The first lens group Gr1 is composed of, in order from the object side: a cemented lens element composed of a negative meniscus lens element concave to the image side and a positive meniscus lens element convex to the object side; and a positive meniscus lens element convex to the object side. The second lens group Gr2 is composed of, in order from the object side: a negative meniscus lens concave to the image side; a negative biconcave lens element; and a positive meniscus lens element convex to the object side. The third lens group Gr3 is composed of, in order from the object side: a stop ST; a positive biconvex lens element having an object side surface formed of an aspherical surface; and a cemented lens element composed of a negative meniscus lens element concave to the image side and a positive biconvex lens element. The fourth lens group Gr4 is composed of one negative meniscus lens element having aspherical surfaces on both sides and concave to the image side. The fifth lens group Gr5 is composed of one positive biconvex lens element having aspherical surfaces on both sides.

In the second embodiment (FIG. 2), the lens groups are constructed as described below. The first lens group Gr1 is composed of, in order from the object side: a cemented lens element composed of a negative meniscus lens element concave to the image side and a positive meniscus lens element convex to the object side; and a positive meniscus lens element convex to the object side. The second lens group Gr2 is composed of, in order from the object side: a negative meniscus lens element concave to the image side; a negative biconcave lens element; and a positive meniscus lens element convex to the object side. The third lens group Gr3 is composed of, in order from the object side: a stop ST; a positive biconvex lens element with an object side surface thereof formed of an aspherical surface; and a cemented lens element composed of a negative meniscus lens element concave to the image side and a positive biconvex lens element. The fourth lens group Gr4 is composed of one negative meniscus lens element having aspherical surfaces on both sides and concave to the image side. The fifth lens group Gr5 is composed of one positive biconvex lens element having aspherical surfaces on both sides.

In the third embodiment (FIG. 3), the lens groups are constructed as described below. The first lens group Gr1 is composed of, in order from the object side: a cemented lens element composed of a negative meniscus lens element concave to the image side and a positive meniscus lens element convex to the object side; and a positive meniscus lens element convex to the object side. The second lens group Gr2 is composed of, in order from the object side: a negative meniscus lens element concave to the image side; a negative biconcave lens element; and a positive meniscus lens element convex to the object side. The third lens group Gr3 is composed of, in order from the object side: a positive biconvex lens element; a stop ST; a positive biconvex lens element; and a cemented lens element composed of a negative biconcave lens element and a positive biconvex lens element. The fourth lens group Gr4 is composed of one negative meniscus lens element having aspherical surfaces on both sides and concave to the image side. The fifth lens group Gr5 is composed of one positive biconvex lens element having aspherical surfaces on both sides.

In the fourth embodiment (FIG. 4), the lens groups are constructed as described below. The first lens group Gr1 is composed of, in order from the object side: a cemented lens element composed of a negative meniscus lens element concave to the image side and a positive meniscus lens element convex to the object side; and a positive meniscus lens element convex to the object side. The second lens group Gr2 is composed of, in order from the object side: a negative meniscus lens element concave to the image side; a negative biconcave lens element; and a positive meniscus lens element convex to the object side. The third lens group Gr3 is composed of, in order from the object side: a positive biconvex lens element; a stop ST; a positive biconvex lens element; and a cemented lens element composed of a negative biconcave lens element and a positive biconvex lens element. The fourth lens group Gr4 is composed of one negative meniscus lens element having aspherical surfaces on both sides and concave to the image side. The fifth lens group Gr5 is composed of one positive biconvex lens element having aspherical surfaces on both sides.

As shown in FIGS. 10A to 10D, in the first to fourth embodiments (FIGS. 1 to 4), the movement locus of each of the first to fourth lens groups as movable groups is curved. In the first and third embodiments, the first lens group Gr1 has, between the wide-angle end (W) and the middle focal length (M), a focal length located closer to the image side than at the wide-angle end (W). That is, after moving to the image side, the first lens group Gr1 makes a U-turn movement from the image side to the object side in such a manner as to draw a convex locus to the image side between the wide-angle end (W) and the middle focal length (M). In the second and fourth embodiments, the first lens group Gr1 is located closest to the image side at the wide-angle end (W) and located closest to the object side at the telephoto end (T). That is, in zooming from the wide-angle end (W) to the telephoto end (T), the first lens group Gr1 moves monotoneously to the object side in such a manner as to draw a movement locus having no extreme values. The second lens group Gr2 moves monotoneously to the image side in such a manner as to draw a movement locus having no extreme values during zooming from the wide-angle end (W) to the telephoto end (T). The third lens group Gr3 and the fourth lens group Gr4 have, between the middle focal length (M) and the telephoto end (T), a focal length located closer the object side than at the middle focal length (M). That is, after moving to the object side, they make U-turn movements from the object side to the image side in such a manner as to draw a locus convex to the object side between the middle focal length (M) and the telephoto end (T).

As in the embodiments described above, by having characteristic construction, the zoom lens including a portion with a whole angle of view of over 70 degrees in a zoom area and having a high variable magnification ratio of approximately 12× can be achieved in a maximum optical full length of approximately 78 mm without involving cost increase while holding high optical performance with spherical aberration and a curvature of field of 50 µm or less and with a maximum distortion of approximately 5% over the entire zoom area. Therefore, the zoom lens which includes in a zoom area a wide angle of view with a whole angle of view of over 70 degrees and which has a high variable magnification ratio of approximately 12× and an image sensing apparatus provided therewith can be achieved at low costs. Then using this image sensing apparatus in a digital device such as a digital camera can contribute to slimming-down, weight saving, compactification, cost reduction, performance enhancement, capability enhancement, etc. of the digital device.

EXAMPLES

Hereinafter, construction, etc. of the zoom lens embodying the present invention will be described in more detail with reference to their construction data and other data. Examples 1 to 4 presented below are numerical examples respectively corresponding to the first to fourth embodiments described above. Thus, the optical construction diagrams (FIGS. 1 to 4) and the movement locus diagrams (FIGS. 10A and 10D) showing the first to fourth embodiments also show the lens constructions, optical paths, zoom movements, etc. of Examples 1 to 4, respectively.

The construction data of these examples show, in order from the left column: the surface number, the radius of curvature r (in mm), the axial distance d (in mm), the refractive index nd for the d-line, and the Abbe number vd for the d-line. A surface whose surface number is marked with an asterisk (*) is an aspherical surface and defined by formula (AS) below representing an aspherical surface shape. In aspherical surface data of these examples, the coefficient of any term that does not appear equals zero, and that, for all the data, "E-n" stands for "$\times 10^{-n}$".

$$X(H)=(C0\cdot H^2)/[1+\sqrt{1-(1+K)\cdot C0^2\cdot H^2}]+\Sigma(Aj\cdot H^j) \quad (AS)$$

where

X(H) represents the displacement in a direction of the optical axis AX at a height H (relative to the vertex);

H represents the height in a direction perpendicular to the optical axis AX;

C0 represents the paraxial curvature (=1/r);

K represents the conic coefficient; and

Aj represents the aspherical surface coefficient of order j.

Shown as various data are: a zoom ratio, a focal length (in mm), an F number, a half angle of view (°), an image height (in mm), a total lens length, back focus (BF, in mm), and variable axial distances (in mm). Shown as zoom lens group data are focal lengths (in mm) of the respective lens groups. Table 1 shows the values corresponding to the conditional formulae as actually observed in each example.

FIGS. 5A to 5I to FIGS. 8A to 8I are aberration diagrams respectively corresponding to Examples 1 to 4, showing various aberration (in order from the left, spherical aberration, etc., astigmatism, and distortion) at (W) representing the wide-angle end, (M) representing a middle focal length, and (T) representing the telephoto end. In FIGS. 5A to 5I to FIGS. 8A to 8I, FNO represents an F number, and Y'(mm) represents a maximum image height on the sensing surface SS of the image sensor SR (corresponding to a distance from the optical axis AX). In the spherical surface diagrams, solid lines d, chain lines g, and two-dot chain lines c represent spherical aberration (in mm) for the d-line, g-line, and c-line, respectively, and broken lines SC represent deviation from sine condition (in mm). In the astigmatism diagrams, broken lines DM and solid lines DS represent astigmatism (in mm) for the d-line on the meridional plane and on the sagittal plane, respectively. In addition, in the distortion diagrams, solid lines represent distortion (in %) for the d-line.

Example 1

| | Unit: mm Surface data | | | |
|---|---|---|---|---|
| Surface | r | d | nd | vd |
| 1 | 49.749 | 1.500 | 1.84666 | 23.78 |
| 2 | 26.496 | 4.760 | 1.48749 | 70.45 |
| 3 | 452.582 | 0.100 | | |
| 4 | 26.644 | 3.300 | 1.80420 | 46.49 |
| 5 | 83.835 | Variable | | |
| 6 | 36.603 | 0.900 | 1.88300 | 40.80 |
| 7 | 8.600 | 4.300 | | |
| 8 | −16.472 | 0.700 | 1.72916 | 54.66 |
| 9 | 12.459 | 1.300 | | |
| 10 | 15.204 | 2.000 | 1.92286 | 20.88 |
| 11 | 77.446 | Variable | | |
| 12(Stop) | ∞ | 0.100 | | |
| 13* | 17.629 | 1.600 | 1.80610 | 40.71 |
| 14 | −60.832 | 2.300 | | |
| 15 | 20.004 | 2.000 | 1.84666 | 23.78 |
| 16 | 7.873 | 3.100 | 1.51680 | 64.20 |
| 17 | −11.795 | Variable | | |
| 18* | 20.184 | 2.300 | 1.60700 | 27.10 |
| 19* | 5.706 | Variable | | |
| 20* | 32.453 | 3.500 | 1.53048 | 55.72 |
| 21* | −11.189 | 3.437 | | |
| 22 | ∞ | 1.100 | 1.51680 | 64.20 |
| 23 | ∞ | 0.000 | | |

Aspherical surface data

Surface 13

K = 0.0000, A4 = −1.2187E−04, A6 = −2.8444E−06, A8 = 3.0018E−07, A10 = −1.2141E−08

Surface 18

K = 0.0000, A4 = −4.9561E−04, A6 = 4.5690E−05, A8 = −3.7376E−06, A10 = 1.3540E−07

-continued

Surface 19

K = 0.0000, A4 = −5.1491E−04, A6 = 1.1034E−04, A8 = −1.1945E−05, A10 = 4.4900E−07
Surface 20

K = 0.0000, A4 = 7.4489E−04, A6 = 4.3708E−05, A8 = −1.5470E−06, A10 = 3.0185E−08
Surface 21

K = 0.0000, A4 = 6.3073E−04, A6 = 4.5911E−05, A8 = −1.5436E−06, A10 = 4.7787E−08

Various data

| Zoom ratio | | 11.64 | |
|---|---|---|---|
| | (W) | (M) | (T) |
| Focal length | 5.045 | 17.457 | 58.729 |
| F number | 2.850 | 3.675 | 3.710 |
| Half angle of view | 38.671 | 12.113 | 3.715 |
| Image height | 3.840 | 3.840 | 3.840 |
| Total lens length | 68.096 | 71.701 | 78.000 |
| BF | 1.2000 | 1.2000 | 1.2000 |
| d5 | 0.5000 | 13.3250 | 25.5846 |
| d11 | 22.9742 | 8.4067 | 2.0879 |
| d17 | 1.8999 | 4.8632 | 3.8758 |
| d19 | 3.2241 | 5.6089 | 6.9544 |

Zoom lens group data

| Group | Starting surface | Focal length |
|---|---|---|
| 1 | 1 | 43.062 |
| 2 | 6 | −7.301 |
| 3 | 12 | 11.223 |
| 4 | 18 | −13.943 |
| 5 | 20 | 16.133 |

Example 2

Unit: mm
Surface data

| Surface | r | d | nd | vd |
|---|---|---|---|---|
| 1 | 50.395 | 1.500 | 1.84666 | 23.78 |
| 2 | 26.560 | 4.900 | 1.48749 | 70.45 |
| 3 | 523.361 | 0.100 | | |
| 4 | 26.474 | 3.300 | 1.80420 | 46.49 |
| 5 | 84.037 | Variable | | |
| 6 | 44.137 | 0.900 | 1.88300 | 40.80 |
| 7 | 8.745 | 4.300 | | |
| 8 | −18.437 | 0.700 | 1.71300 | 53.93 |
| 9 | 12.110 | 1.400 | | |
| 10 | 15.082 | 2.000 | 1.92286 | 20.88 |
| 11 | 62.420 | Variable | | |
| 12(Stop) | ∞ | 0.100 | | |
| 13* | 16.978 | 1.700 | 1.80610 | 40.71 |
| 14 | −42.885 | 2.300 | | |
| 15 | 24.047 | 2.000 | 1.84666 | 23.78 |
| 16 | 7.899 | 3.200 | 1.51823 | 58.96 |
| 17 | −11.468 | Variable | | |
| 18* | 45.212 | 2.600 | 1.60700 | 27.10 |
| 19* | 6.247 | Variable | | |
| 20* | 29.985 | 3.600 | 1.53048 | 55.72 |
| 21* | −10.329 | 3.121 | | |
| 22 | ∞ | 1.100 | 1.51680 | 64.20 |
| 23 | ∞ | 0.000 | | |

Aspherical Surface data

Surface 13

K = 0.0000, A4 = −1.2969E−04, A6 = −3.0803E−06, A8 = 2.9570E−07, A10 = −1.0851E−08
Surface 18

K = 0.0000, A4 = −3.5251E−04, A6 = 3.6953E−05, A8 = −2.7487E−06, A10 = 1.0236E−07
Surface 19

K = 0.0000, A4 = −1.8125E−04, A6 = 9.0172E−05, A8 = −8.9051E−06, A10 = 3.3805E−07
Surface 20

K = 0.0000, A4 = 6.9924E−04, A6 = 3.5395E−05, A8 = −1.2193E−06, A10 = 2.5073E−08
Surface 21

K = 0.0000, A4 = 6.1531E−04, A6 = 4.6297E−05, A8 = −1.8354E−06, A10 = 5.1670E−08

Various data

| Zoom ratio | | 11.64 | |
|---|---|---|---|
| | (W) | (M) | (T) |
| Focal length | 5.045 | 17.457 | 58.728 |
| F number | 2.850 | 3.660 | 3.723 |
| Half angle of view | 38.672 | 12.128 | 3.687 |
| Image height | 3.840 | 3.840 | 3.840 |
| Total lens length | 69.299 | 72.735 | 78.000 |
| BF | 1.2001 | 1.2002 | 1.2002 |
| d5 | 0.5000 | 13.5010 | 25.2626 |
| d11 | 23.7817 | 9.0898 | 2.1140 |
| d17 | 1.9247 | 4.5351 | 4.1011 |
| d19 | 3.0716 | 5.5886 | 6.5018 |

Zoom lens group data

| Group | Starting surface | Focal length |
|---|---|---|
| 1 | 1 | 42.74 |
| 2 | 6 | −7.312 |
| 3 | 12 | 11.091 |
| 4 | 18 | −12.25 |
| 5 | 20 | 14.944 |

Example 3

Unit: mm
Surface data

| Surface | r | d | nd | vd |
|---|---|---|---|---|
| 1 | 50.772 | 1.500 | 1.84666 | 23.78 |
| 2 | 28.374 | 4.800 | 1.48749 | 70.45 |
| 3 | 496.259 | 0.100 | | |
| 4 | 27.555 | 3.400 | 1.77250 | 49.65 |
| 5 | 81.579 | Variable | | |
| 6 | 62.848 | 0.900 | 1.88300 | 40.80 |
| 7 | 9.355 | 4.400 | | |
| 8 | −28.218 | 0.700 | 1.71300 | 53.93 |
| 9 | 11.703 | 1.410 | | |
| 10 | 14.121 | 2.300 | 1.92286 | 20.88 |
| 11 | 48.011 | Variable | | |
| 12 | 35.615 | 1.400 | 1.80420 | 46.49 |
| 13 | −36.208 | 0.280 | | |
| 14(Stop) | ∞ | 0.870 | | |
| 15 | 10.535 | 2.600 | 1.59551 | 39.23 |
| 16 | −8.462 | 2.800 | 1.80610 | 33.27 |

-continued

| | | | | |
|---|---|---|---|---|
| 17 | 5.535 | 2.700 | 1.65844 | 50.84 |
| 18 | −11.674 | Variable | | |
| 19* | 7.100 | 1.100 | 1.60700 | 27.10 |
| 20* | 3.401 | Variable | | |
| 21* | 22.815 | 3.400 | 1.53048 | 55.72 |
| 22* | −11.634 | 2.744 | | |
| 23 | ∞ | 1.100 | 1.51680 | 64.20 |
| 24 | ∞ | 0.000 | | |

Aspherical Surface data

Surface 19

$K = 0.0000, A4 = -4.4350E-03, A6 = 3.6218E-04, A8 = -3.5765E-05, A10 = 1.7826E-06$

Surface 20

$K = 0.0000, A4 = -7.2133E-03, A6 = 3.8960E-04, A8 = -5.4771E-05, A10 = 1.1718E-06$

Surface 21

$K = 0.0000, A4 = 8.4309E-04, A6 = 4.7699E-05, A8 = -1.6842E-06, A10 = 3.4713E-08$

Surface 22

$K = 0.0000, A4 = 7.9730E-04, A6 = 3.7810E-05, A8 = -8.2557E-07, A10 = 3.7474E-08$

Various data

| Zoom ratio | | 11.64 | |
|---|---|---|---|
| | (W) | (M) | (T) |
| Focal length | 5.045 | 17.457 | 58.729 |
| F number | 2.850 | 3.652 | 3.702 |
| Half angle of view | 38.699 | 12.202 | 3.728 |
| Image height | 3.840 | 3.840 | 3.840 |
| Total lens length | 69.584 | 72.983 | 78.000 |
| BF | 1.2000 | 1.2000 | 1.2000 |
| d5 | 0.5000 | 14.7610 | 27.2426 |
| d11 | 24.1396 | 8.6351 | 0.7477 |
| d18 | 2.0285 | 4.1110 | 3.4779 |
| d20 | 3.2122 | 5.7721 | 6.8279 |

Zoom lens group data

| Group | Starting surface | Focal length |
|---|---|---|
| 1 | 1 | 45.778 |
| 2 | 6 | −8.105 |
| 3 | 12 | 10.91 |
| 4 | 19 | −12.112 |
| 5 | 21 | 15.039 |

Example 4

Unit: mm
Surface data

| Surface | r | d | nd | vd |
|---|---|---|---|---|
| 1 | 49.581 | 1.500 | 1.84666 | 23.78 |
| 2 | 24.866 | 4.800 | 1.48749 | 70.45 |
| 3 | 372.943 | 0.100 | | |
| 4 | 25.063 | 3.400 | 1.80420 | 46.49 |
| 5 | 86.853 | Variable | | |
| 6 | 73.579 | 0.900 | 1.77250 | 49.65 |
| 7 | 8.015 | 4.000 | | |
| 8 | −30.295 | 0.700 | 1.69680 | 55.48 |
| 9 | 10.019 | 1.400 | | |
| 10 | 12.047 | 1.900 | 1.92286 | 20.88 |
| 11 | 26.718 | Variable | | |

-continued

| | | | | |
|---|---|---|---|---|
| 12 | 31.858 | 1.400 | 1.80420 | 46.49 |
| 13 | −25.745 | 0.250 | | |
| 14(Stop) | ∞ | 0.870 | | |
| 15 | 9.234 | 2.400 | 1.58913 | 61.24 |
| 16 | −8.979 | 2.500 | 1.80610 | 40.73 |
| 17 | 5.524 | 3.700 | 1.56883 | 56.04 |
| 18 | −10.018 | Variable | | |
| 19* | 14.947 | 0.800 | 1.60700 | 27.10 |
| 20* | 4.428 | Variable | | |
| 21* | 23.664 | 3.600 | 1.53048 | 55.72 |
| 22* | −10.717 | 2.464 | | |
| 23 | ∞ | 1.100 | 1.51680 | 64.20 |
| 24 | ∞ | 0.000 | | |

Aspherical Surface data

Surface 19

$K = 0.0000, A4 = -3.1598E-03, A6 = 2.1518E-04, A8 = -9.6653E-06, A10 = 4.5571E-07$

Surface 20

$K = 0.0000, A4 = -3.5151E-03, A6 = 2.1234E-04, A8 = -1.3183E-05, A10 = 5.0721E-07$

Surface 21

$K = 0.0000, A4 = 1.1121E-03, A6 = 2.1813E-05, A8 = -7.5652E-07, A10 = 1.8315E-08$

Surface 22

$K = 0.0000, A4 = 1.0148E-03, A6 = 2.0422E-05, A8 = -2.0878E-07, A10 = 1.9530E-08$

Various data

| Zoom ratio | | 11.64 | |
|---|---|---|---|
| | (W) | (M) | (T) |
| Focal length | 5.045 | 17.458 | 58.728 |
| F number | 3.319 | 4.418 | 5.000 |
| Half angle of view | 38.679 | 12.349 | 3.743 |
| Image height | 3.840 | 3.840 | 3.840 |
| Total lens length | 66.966 | 71.425 | 75.180 |
| BF | 1.2001 | 1.1999 | 1.2003 |
| d5 | 0.5000 | 12.9192 | 22.5453 |
| d11 | 22.5268 | 9.2620 | 0.8366 |
| d18 | 2.0000 | 4.0756 | 5.8458 |
| d20 | 2.9553 | 6.1853 | 6.9681 |

Zoom lens group data

| Group | Starting surface | Focal length |
|---|---|---|
| 1 | 1 | 40.936 |
| 2 | 6 | −6.921 |
| 3 | 12 | 10.473 |
| 4 | 19 | −10.673 |
| 5 | 21 | 14.429 |

TABLE 1

| Values of Conditional Formulae | | Example 1 | Example 2 | Example 3 | Example 4 |
| --- | --- | --- | --- | --- | --- |
| Formula (1) | $f4/\sqrt{fw \cdot ft}$ | −0.810 | −0.712 | −0.704 | −0.620 |
| Formula (2) | $f1/\sqrt{fw \cdot ft}$ | 2.502 | 2.483 | 2.659 | 2.378 |
| Formula (3) | $f4/f5$ | −0.864 | −0.820 | −0.805 | −0.740 |
| Formula (4) | $(R1 + R2)/(R1 − R2)$ | 1.788 | 1.321 | 2.839 | 1.842 |
| Formula (5) | $ndn − ndp$ | — | — | 0.179 | 0.227 |

What is claimed is:

1. A zoom lens for forming an optical image of an object on a sensing surface of an image sensor at a variable magnification, the zoom lens comprising, in order from an object side to an image side:

a first lens group having a positive optical power;
a second lens group having a negative optical power;
a third lens group having a positive optical power;
a fourth lens group having a negative optical power; and
a fifth lens group having a positive optical power,
wherein between the second lens group and the fourth lens group, an optical aperture stop is located, and
wherein the fourth lens group is composed of one negative lens element having at least one aspherical surface and having a paraxial radius of curvature of an image side surface smaller than a paraxial radius of curvature of an object side surface, and satisfies conditional formula (1) below:

$$-1.15 < f4/\sqrt{fw \cdot ft} < -0.5 \qquad (1),$$

where
f4 represents a focal length of the fourth lens group;
fw represents a focal length of the entire zoom lens at a wide-angle end; and
ft represents a focal length of the entire zoom lens at a telephoto end.

2. The zoom lens according to claim 1,
wherein the fifth lens group is composed of one positive lens element.

3. The zoom lens according to claim 2,
wherein the positive lens element in the fifth lens group has at least one aspherical surface.

4. The zoom lens according to claim 2,
wherein a material of the positive lens element in the fifth lens group is resin.

5. The zoom lens according to claim 1,
wherein the fifth lens group is fixed during zooming.

6. The zoom lens according to claim 1,
wherein a material of the negative lens element in the fourth lens group is resin.

7. The zoom lens according to claim 1,
wherein conditional formulae (2) and (3) below are satisfied:

$$1.6 < f1/\sqrt{fw \cdot ft} < 5.0 \qquad (2),$$

$$-2.0 < f4/f5 < -0.5 \qquad (3),$$

where
f1 represents a focal length of the first lens group; and
f5 represents a focal length of the fifth lens group.

8. The zoom lens according to claim 1,
wherein the fourth lens group is moved along an optical axis to thereby perform focusing on an object at a short distance.

9. The zoom lens according to claim 1,
wherein the third lens group includes a triplet-cemented lens element.

10. The zoom lens according to claim 4,
wherein the lens element whose material is resin is a lens element whose material has particles of a maximum length of 30 nanometers or less dispersed in a resin material.

11. An image sensing apparatus comprising:
a zoom lens for forming an optical image of an object at a variable magnification; and
an image sensor converting an optical image formed on a sensing surface into an electrical signal,
wherein the zoom lens is arranged such that an optical image of a subject is formed on the sensing surface of the image sensor,
wherein the zoom lens comprises, in order from an object side to an image side: a first lens group having a positive optical power; a second lens group having a negative optical power; a third lens group having a positive optical power; a fourth lens group having a negative optical power; and a fifth lens group having a positive optical power,
wherein between the second lens group and the fourth lens group, an optical aperture stop is located, and
wherein the fourth lens group is composed of one negative lens element having at least one aspherical surface and having a paraxial radius of curvature of an image side surface smaller than a paraxial radius of curvature of an object side surface, and satisfies conditional formula (1) below:

$$-1.15 < f4/\sqrt{fw \cdot ft} < -0.5 \qquad (1),$$

where
f4 represents a focal length of the fourth lens group;
fw represents a focal length of the entire zoom lens at a wide-angle end; and
ft represents a focal length of the entire zoom lens at a telephoto end.

* * * * *